US 7,724,646 B2

(12) United States Patent
Deng et al.

(10) Patent No.: US 7,724,646 B2
(45) Date of Patent: May 25, 2010

(54) SYSTEM AND METHOD FOR IMPLEMENTING SERVICE SWITCHING

(75) Inventors: Chaojun Deng, Shenzhen (CN); Ziqiang Wang, Shenzhen (CN); Jinhua Ye, Shenzhen (CN)

(73) Assignee: Huawei Technologies, Co., Ltd., Shenzhen (CN)

( * ) Notice: Subject to any disclaimer, the term of this patent is extended or adjusted under 35 U.S.C. 154(b) by 745 days.

(21) Appl. No.: 11/564,541

(22) Filed: Nov. 29, 2006

(65) Prior Publication Data
US 2007/0121488 A1 May 31, 2007

(30) Foreign Application Priority Data
Nov. 30, 2005 (CN) .................. 2005 1 0125850

(51) Int. Cl.
H04J 3/14 (2006.01)
H04L 1/24 (2006.01)
H04L 12/26 (2006.01)

(52) U.S. Cl. .................. 370/216; 370/218
(58) Field of Classification Search ........... 370/216, 370/217, 218
See application file for complete search history.

(56) References Cited

U.S. PATENT DOCUMENTS

| 5,408,462 | A |   | 4/1995 | Opoczynski |
| 5,845,061 | A |   | 12/1998 | Miyamoto et al. |
| 5,953,314 | A | * | 9/1999 | Ganmukhi et al. ........... 370/220 |
| 6,314,525 | B1 | * | 11/2001 | Mahalingham et al. ......... 714/4 |
| 6,460,146 | B1 | * | 10/2002 | Moberg et al. ................ 714/10 |
| 6,603,736 | B1 |   | 8/2003 | Huber et al. |
| 7,039,046 | B1 | * | 5/2006 | Simons et al. .............. 370/388 |
| 7,139,928 | B1 |   | 11/2006 | Bhattacharya et al. |
| 7,363,534 | B1 | * | 4/2008 | Krishnamurthy et al. ....... 714/13 |
| 7,417,947 | B1 | * | 8/2008 | Marques et al. ............. 370/220 |
| 7,421,612 | B1 | * | 9/2008 | Maranhao et al. .............. 714/4 |
| 7,518,986 | B1 | * | 4/2009 | Chadalavada et al. ........ 370/218 |
| 2002/0152103 | A1 | * | 10/2002 | Ojha et al. ...................... 705/7 |
| 2003/0188126 | A1 | * | 10/2003 | Sudo .............................. 712/1 |
| 2004/0078621 | A1 | * | 4/2004 | Talaugon et al. ............... 714/4 |

(Continued)

FOREIGN PATENT DOCUMENTS

JP   8-212095 A   8/1996

(Continued)

Primary Examiner—Chi H Pham
Assistant Examiner—Ahmed Elallam
(74) Attorney, Agent, or Firm—Leydig, Voit & Mayer, Ltd.

(57) ABSTRACT

A system for implementing service switching includes a primary service processing unit, a physical interface card, a control center, a switching unit and a standby service processing unit, to guarantee that the physical interface card connected to the failed primary service processing unit transmits the service data that should be processed by the primary service processing unit to the standby service processing unit, and to control the control switching unit to transmit the service data that should be transmitted to the primary service processing unit to the standby service processing unit. A method for implementing service switching includes: managing the physical interface card to transmit the service data that should be processed by the primary service processing unit to the standby service processing unit, and managing the switching unit to transmit the service data that should be transmitted to the primary service processing unit to the standby service processing unit.

20 Claims, 2 Drawing Sheets

U.S. PATENT DOCUMENTS

2007/0076594 A1 * 4/2007 Khan et al. ................ 370/220

FOREIGN PATENT DOCUMENTS

| | | | |
|---|---|---|---|
| JP | 2000-224079 A | 8/2000 | |
| JP | 2001-102969 A | 4/2001 | |
| JP | 2004-064395 A | 2/2004 | |
| WO | WO 2004/036848 A2 | 4/2004 | |

* cited by examiner

SYSTEM AND METHOD FOR IMPLEMENTING SERVICE SWITCHING

This application claims priority to Chinese Patent Application No. 200510125850.5, filed Nov. 30, 2005, which is hereby incorporated by reference.

BACKGROUND OF THE INVENTION

The present invention relates to service processing technology of communication equipment, and more particularly to a system and method for implementing service switching.

In the currently applied communication networks, communication equipment is used everywhere. Each piece of such equipment may be considered as a service processing system used for processing services in the communication network. Thus communication equipment in the communication networks may be called service processing system.

FIG. 1 is a diagram illustrating the service processing system according to the prior art. Service processing system 100 in FIG. 1 includes a control center 110, a wiring board and a switching unit 140. Those skilled in the art should understand that, in the service processing system 100, one or more wiring boards may be included, such as wiring board 120, wiring board 130 and so on. Also, one or more physical interface cards and service processing units may be set on each wiring board. One physical interface card may connect to one or more service processing units. In FIG. 1, a physical interface card 121 and a service processing unit 122 connected to each other are set on wiring board 120, and a physical interface card 131 and a service processing unit 132 connected to each other are set on wiring board 130. Besides the connection shown in FIG. 1, switching unit 140 may also be connected to switching units or service processing units of other service processing systems.

Control center 110 connects to the physical interface cards in all the wiring boards in service processing system 100, and is used for performing such operations as configuration and communication control on each physical interface card and service processing unit by way of communication interaction. Control center 110 is also connected to switching unit 140 and is used for performing such operations as configuration and communication control on switching unit 140 by way of communication interaction. Each physical interface card receives and transfers communication information according to the configuration of control center 110, and each service processing unit processes services according to the configuration of control center 110. Switching unit 140 also receives and transmits service data from and to service processing system 100 according to the configuration of control center 110, as well as receives and transmits service data from and to the switching units and service processing units of other connected service processing systems.

However, when a failure occurs in the service processing unit, it is not easy to continue services in the service processing unit.

SUMMARY OF THE INVENTION

An embodiment of the present invention provides a system and a method for implementing service switching to increase the reliability of the service processing system and the user's satisfaction.

In an embodiment of the present invention, a system for implementing service switching may include a primary service processing unit, a physical interface card connected to the primary service processing unit, a control center connected to the physical interface card, a switching unit connected to the primary service processing unit and the control center, and a standby service processing unit connected to the physical interface card and the switching unit.

The control center is used for acquiring and determining a working state of the primary service processing unit. When the primary service processing unit is normal, the control center may manage the physical interface card connected to the primary service processing unit to transmit service data to the primary service processing unit, and when the primary service processing unit fails, the control center may manage the physical interface card connected to the primary service processing unit to transmit the service data to the standby service processing unit, and manage the switching unit to transmit the service data to the standby service processing unit. The switching unit may be used for transmitting the service data to the primary service processing unit or to the standby service processing unit. The physical interface card may be used for transmitting the service data to the primary service processing unit or to the standby service processing unit. The primary service processing unit may be used for providing the working state of the primary service processing unit when the primary service processing unit is normal, and the standby service processing unit may be used for processing the service data when the primary service processing unit fails.

In another embodiment of the present invention, a method for implementing service switching may include:

acquiring and determining a working state of the primary service processing unit;

when the primary service processing unit fails, according to the working state of the primary service processing unit, managing the physical interface card connected to the primary service processing unit to transmit service data to the standby service processing unit, and managing the switching unit to transmit the service data to the standby service processing unit; and processing the service data by the standby service processing unit.

The system for implementing service switching provided in the preferred embodiments of the present invention may include a primary service processing unit, a physical interface cards, a control center, a switching unit and a standby service processing unit, wherein these devices cooperate to guarantee that corresponding physical interface card of the failed primary service processing unit may transmit the service data that should be processed by the primary service processing unit to the standby service processing unit, and the control switching unit may transmit the service data that should be transmitted to the primary service processing unit to the standby service processing unit. According to the system for implementing service switching provided in the preferred embodiments of the present invention, the control center manages the physical interface card connected to the failed primary service processing unit to transmit the service data that should be processed by the primary service processing unit to the standby service processing unit, and manages the switching unit to transmit the service data, which should be transmitted to the primary service processing unit, to the standby service processing unit. Both the system and the method provided in the preferred embodiments of the present invention may improve the reliability of the service processing system as well as increase satisfaction degree of the user.

DETAILED DESCRIPTION OF THE INVENTION

Figure 1:
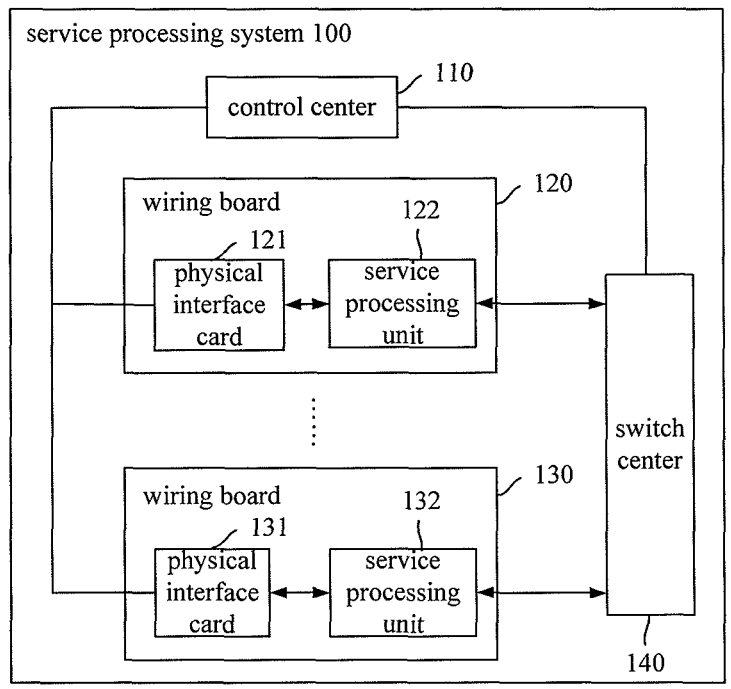
FIG. 1 is a simplified schematic diagram illustrating the service processing system according to the prior art.

According to the solution shown in FIG. 1, when a failure occurs in the service processing unit of service processing system 100, the service processing unit cannot continue normal service processing, and the service is not able to be switched to other service processing units, which leads to interruption of all services in the failed service processing unit and obviously decreases the reliability of service processing system 100 without satisfying requirements of the telecommunication-level equipment. Moreover, the service interruption will decrease the user's satisfaction.

The present invention relates to service processing technology of communication equipment, and more particularly to a system and method for implementing service switching.

The system for implementing service switching provided in an embodiment of the present invention may include a primary service processing unit, a physical interface card connected to the primary service processing unit, a control center connected to the physical interface card, a switching unit connected to the primary service processing unit and the control center, as well as a standby service processing unit connected to the physical interface card and the switching unit. This is merely an example, which should not unduly limit the scope of the claims. One of ordinary skill in the art would recognize many variations, alternatives, and modifications. For example, there may be one or more primary service processing units and physical interface cards, and one physical interface card may connect to one or more service processing units.

The devices in the provided system cooperate to guarantee that the physical interface card connected to the failed primary service processing unit may transmit the service data that should be processed by the primary service processing unit to the standby service processing unit, and to manage the control switching unit to transmit the service data that should be transmitted to the primary service processing unit to the standby service processing unit. Furthermore, these devices provided in the system also cooperate to guarantee that the physical interface card connected to the recovered primary service processing unit may transmit the service data that should be processed by the primary service processing unit to the primary service processing unit, and to control the switching unit to transmit the service data that is to be transmitted to the standby service processing unit and should be processed by the primary service processing unit, to the primary service processing unit.

The method for implementing service switching provided in an embodiment of the present invention may include these steps. When a primary service processing unit fails, a control center manages a physical interface card connected to the failed primary service processing unit to transmit service data that should be processed by the primary service processing unit to a standby service processing unit, and manages a switching unit to transmit the service data that should be transmitted to the primary service processing unit to the standby service processing unit. In addition, when the primary service processing unit recovers, the method provided in the embodiment of the present invention may further include: the control center manages the physical interface card connected to the recovered primary service processing unit to transmit the service data that should be processed by the primary service processing unit to the primary service processing unit, and manages the switching unit to transmit the service data that is to be transmitted to the standby service processing unit and should be processed by the primary service processing unit, to the primary service processing unit.

Figure 2:
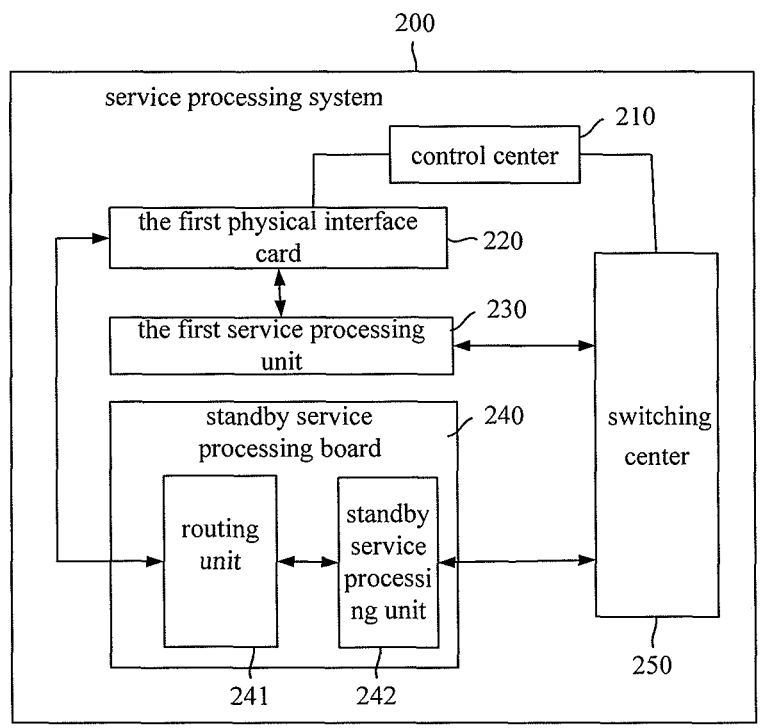
FIG. 2 is a simplified diagram illustrating the system for implementing service switching according to an embodiment of the present invention.

FIG. 2 is a diagram illustrating the system for implementing service switching according to an embodiment of the present invention. In FIG. 2, a service processing system 200 for implementing service switching of the embodiment includes a first physical interface card 220 and a first service processing unit 230 functioning as a primary service processing unit. The first service processing unit 230 is connected to a switching unit 250. The first physical interface card 220 is connected to the first service processing unit 230 and an added standby service processing board 240 of the service processing system 200. In the embodiment, standby service processing board 240 includes a standby service processing unit 242 and a routing unit 241 corresponding to the standby service processing unit 242. The standby service processing unit 242 is connected to the first physical interface card 220 via routing unit 241, and is also connected to switching unit 250.

In service processing system 200, control center 210 is connected to the first physical interface card 220 and switching unit 250. Those skilled in the art also should understand that, control center 210 may also connects to each service processing unit in service processing system 200.

In general, all the physical interface cards may connect to control center 210 and routing unit 241 regardless of the number of the physical interface cards.

In normal operations, control center 210 may timely or periodically acquire the working state of the primary service processing unit in service processing system 200. The working state may be normal, overload, malfunction and so on. Upon receiving the working state of the service processing unit, if control center 210 determines that the service processing unit is failed according to the received working state, control center 210 may manage the physical interface card to communicate with the standby service processing unit rather than communicating with the failed service processing unit in service processing system 200, by interacting with the physical interface card connected to the primary service processing unit and interacting with the standby service processing unit.

Different working states may be identified by different parameters or different parameter values, for example, gzzt0 may be used to denote normal operation, gzzt1 may be used to denote overload, and gzzt2 may be used to denote malfunction and so on. The control center 210 may determine the working state of the primary service processing unit according to the acquired parameters or parameter values.

Taking FIG. 2 for example, the service switching may include the following procedures. The control center 210 may send to the first service processing unit 230 a working state inquiry command directly or through the first physical interface card. Upon receiving the working state inquiry command from control center 210, the first service processing unit 230 may send its working state to control center 210 directly or through the first physical interface card 220. Those skilled in the art also should understand that, the first service processing unit 230 may also voluntarily report its working state to control center 210 directly or through the first physical interface card 220 before receiving the working state inquiry command.

Upon acquiring the working state of the first service processing unit 230, if control unit 210 determines that the first service processing unit 230 is failed according to the working state, control unit 210 may send to the first physical interface card 220 a first switching command including an identity of standby service processing unit 242. Moreover, control center 210 may also send to routing unit 241 a second switching command including an identity of first service processing unit 230 through the first physical interface card 220.

Upon receiving the first switching command from control center 210, the first physical interface card 220 may transmit the subsequent received communication information which should be transmitted to the first service processing unit 230 to standby service processing unit 242 according to the identity of standby service processing unit 242 included in the switching command. Upon receiving the second switching command from control center 210, according to the identity of first service processing unit 230 in the switching command, routing unit 241 may transmit the communication information with respect to the first service processing unit 230 from the first physical interface card 220 to standby service processing unit 242. The standby service processing unit 242 may implement the communication information processing before transmitting the processed information to switching unit 250, and switching unit 250 then performs subsequent processes as transmission on the received communication information.

Note that, when determining that the first service processing unit 230 is failed, control center 210 needs to send to switching unit 250 a third switching command including the identity of the first service processing unit 230 and that of the standby service processing unit 242, so that, by setting different values for the identity of the first service processing unit 230 and that of the standby service processing unit 242 in the third switching command, switching unit 250 that receives the third switching command may determine that the service should be processed by the first service processing unit 230 has been switched to the standby service processing unit 242, and may transmit the communication information that should be transmitted to the first service processing unit 230 to the standby service processing unit 242 instead.

In actual applications, the first physical interface card 220 may also transmit the communication information to be transmitted to the first service processing unit 230 to routing unit 241 simultaneously when the first service processing unit 230 is normal. However, since routing unit 241 has not received the second switching command yet, routing unit 241 may do nothing to the communication information from the first physical interface card 220. In this case, when control center 210 determines that the first service processing unit 230 is failed, control center 210 may send to the first physical interface card 220 an interaction pause command including the identity of the first service processing unit 230, rather than sending the first switching command to the first physical interface card 220. Upon receiving the interaction pause command from control center 210, the first physical interface card 220 stops the communication interaction with the first service processing unit 230 according to the identity of the first service processing unit 230 included in the interaction pause command.

After the above switching operation, the service originally processed by the first service processing unit 230 has already been switched to the standby service processing unit 242, which ensures that even if the first service processing unit 230 is failed, the service being processed by the first service processing unit 230 may be processed continuously rather than being interrupted.

As shown above, control center 210 may acquire the working state of the primary service processing unit in service processing system 200, thus in the case that the primary service processing unit in service processing system 200 recovers from a failure, control center 210 may also acquire the working state of the recovered primary service processing unit and determine that the primary service processing unit recovers. In this case, control center 210 may manage the recovered primary service processing unit to communicate with the physical interface card connected to it by interacting with the physical interface card connected to the recovered primary service processing unit control unit and by interacting with the standby service processing unit in service processing system 200.

Specifically, taking FIG. 2 for example, upon acquiring the working state of the first service processing unit 230, if control center 210 determines that the first service processing unit 230 has recovered, control center 210 may send the first recovery command to the first physical interface card 220.

Upon receiving the first recovery command from control center 210, the first physical interface card 220 may transmit the subsequently received communication information, which should be transmitted to the first service processing unit 230 corresponding to physical interface card 220, to the first service processing unit 230 rather than standby service processing unit 242. The first service processing unit 230 may transmit the communication information processed to switching unit 250, and switching unit 250 then performs subsequent processes as transmission on the received communication information.

Note that, when determining that the first service processing unit 230 has recovered, control center 210 needs to send to switching unit 250 the second recovery command including the identity of the first service processing unit 230 and that of the standby service processing unit 242, so that, by setting different values for the identity of the first service processing unit 230 and that of the standby service processing unit 242 in the second recovery command, the switching unit 250 that receives the second recovery command may determine that the service should be processed by the first service processing unit 230 has been switched from standby service processing unit 242 to the first service processing unit 230, and may transmit the communication information that should be transmitted to the first service processing unit 230 to the first service processing unit 230 rather than to the standby service processing unit 242.

Furthermore, when determining that the first service processing unit 230 is working normally, control center 210 may send to the routing unit 241 a third recovery command including the identity of the first service processing unit 230 through the first physical interface card 220. Upon receiving the third recovery command from control center 210, routing unit 241 determines not to process the communication information with respect to the first service processing unit 230 from the first physical interface card 220.

As such, the service that should be processed by the first service processing unit 230 but is processed by the standby service processing unit 242 may be successfully switched to the first service processing unit 230.

In actual applications, a number of standby service processing units similar to service processing unit 242 may be set in service processing system 200, and the standby processing units are set with different identities to improve the service processing capability of service processing system 200. In this case, when the above-mentioned commands applied during the device-device interactions relate to the standby service processing units included in service processing system 200, these commands need to carry identities of the related standby service processing units to identify different standby service processing units.

In addition, the physical interface card and the service processing unit corresponding to the physical interface card are set in one single board in general, in which case, malfunction of a service processing unit on the single board may lead to the unavailability of the whole single board. To avoid such instance, the physical interface card and the service processing unit corresponding to the physical interface card, such as the first physical interface card 220 and the first service processing unit 230, may be set on two single boards with a backboard to enable the physical interface card and the service processing unit on these two single boards to communicate with each other.

Those skilled in the art should understand that the control center 210 may be a Central Processing Unit (CPU) and the physical interface card 220 may be implemented by a set of physical interface circuit. The communication information refers to service data.

Figure 3:
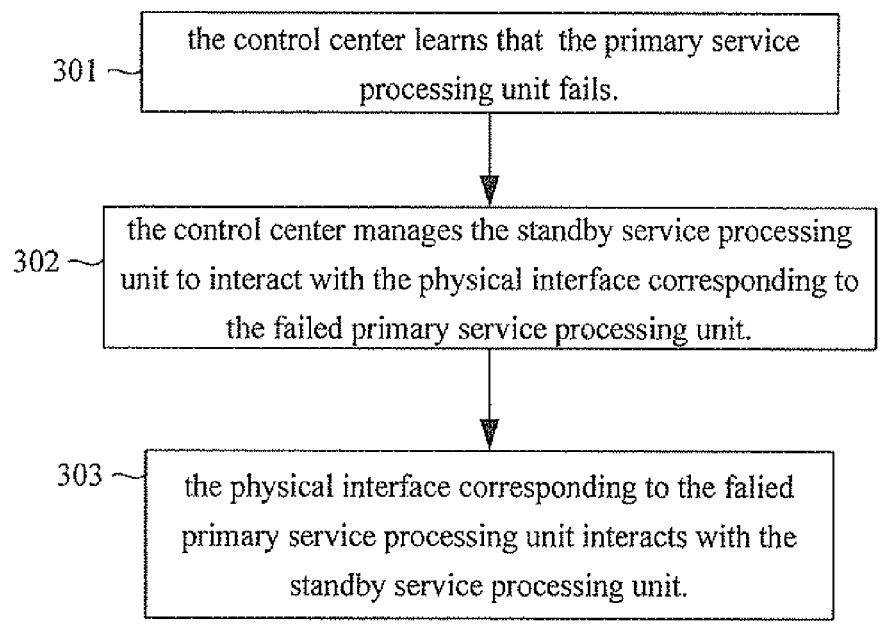
FIG. 3 is a simplified flowchart illustrating the service switching when a failure occurs on the primary service processing unit according to an embodiment of the present invention.
Figure 4:
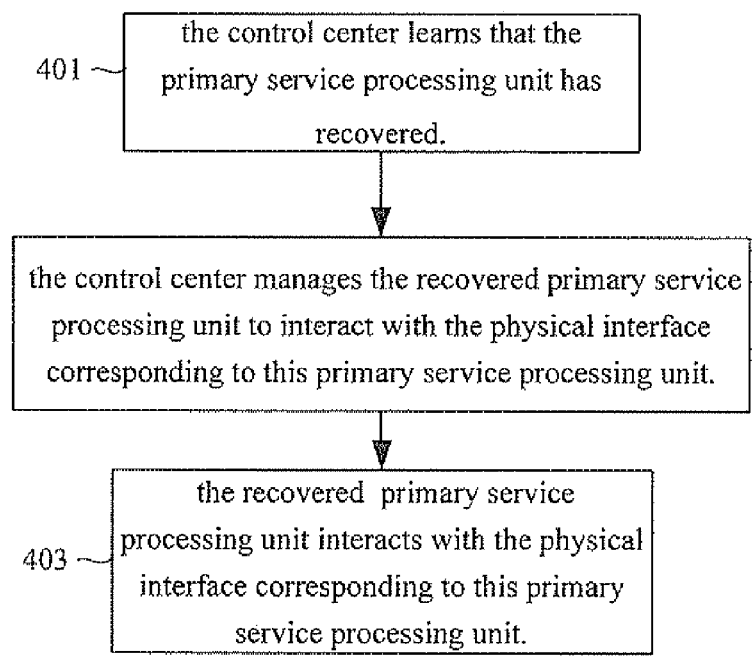
FIG. 4 is a simplified flowchart illustrating the service switching when the primary service processing unit recovers according to an embodiment of the present invention.

The service switching operations implemented by service processing system 200 in FIG. 2 when the first service processing unit 230 is failed and when the first service processing unit 230 has recovered are shown in FIG. 3 and FIG. 4 respectively. The process in FIG. 3 may include the following steps.

Step 301: control center 210 learns that primary service processing unit 230 is failed. Specifically, control center 210 sends a working state inquiry command to primary service processing unit 230. Upon receiving the working state inquiry command from control center 210, primary service processing unit 230 sends its working state to control center 210. Alternatively, before receiving the working state inquiry command, primary service processing unit 230 may voluntarily report its working state to control center 210. According to the received working state, control center 210 may determine that primary service processing unit 230 is failed.

Step 302: control center 210 manages standby service processing unit 242 to interact with physical interface card 220 corresponding to the failed primary service processing unit 230, and manages switching unit 250 to transmit the service data to be transmitted to primary service processing unit 230 to standby service processing unit 242.

Step 303: physical interface card 220 corresponding to the failed primary service processing unit 230 interacts with the standby service processing unit 242, while stops interacting with the failed primary service processing unit 230. The standby service processing unit 242 may transmit the communication information processed by it to switching unit 250, and switching unit 250 then performs subsequent processes as transmission on the received communication information. Moreover, switching unit 250 also transmits the subsequent service data to be transmitted to the failed primary service processing unit 230 to the standby service processing unit 242.

Specifically, in steps 302 and 303, control center 210 sends the first switching command to physical interface card 220 corresponding to the failed primary service processing unit 230, sends the second switching command to routing unit 241 through physical interface card 220 and sends the third switching command to switching unit 250.

Upon receiving the first switching command from control center 210, according to the identity of standby service processing unit 242 included in the command, physical interface card 241 transmits the subsequently received communication information that should be transmitted to primary service processing unit 230 to the standby service processing unit 242 instead. Upon receiving the second switching command, according to the identity of primary service processing unit 230 included in the command, routing unit 241 transmits the subsequent communication information with respect to the primary service processing unit 230 to the standby service processing unit 242. Upon receiving the third switching command, switching unit 250 determines that the service should be processed on primary service processing unit 230 has been switched to the standby service processing unit 242, and transmits the subsequently received communication information that should be transmitted to the primary service processing unit 230 to the standby service processing unit 242 instead.

In actual applications, when the primary service processing unit 230 is in a normal state, the physical interface card 220 may simultaneously transmit the received communication information that should be transmitted to primary service processing unit 230 to primary service processing unit 230 and routing unit 241. However, since routing unit 241 has not received the second switching command, routing unit 241 may do nothing to the communication information from the physical interface card 220. In this case, when control center 210 determines that primary service processing unit 230 is failed, control center 210 may send to the first physical interface card 220 the interaction pause command, rather than sending the first switching command to the physical interface card 220. Upon receiving the interaction pause command from control center 210, the physical interface card 220 stops interacting the primary service processing unit 230 according to the identity of primary service processing unit 230 included in the command.

The processes in FIG. 4 may include the following steps.

Step 401: control center 210 learns that primary service processing unit 230 has recovered. Specifically, control center 210 may acquire the working state of primary service processing unit 230 as that in step 301 and determine that the failed primary service processing unit 230 has recovered according to the acquired working state.

Step 402: control center 210 manages primary service processing unit 230 to interact with physical interface card 220 corresponding to primary service processing unit 230, and manages the switching unit 250 to transmit the service data that is to be transmitted to standby service processing unit 242 and should be processed by primary service processing unit 230 to primary service processing unit 230.

Step 403: the recovered primary service processing unit 230 interacts with physical interface card 220 corresponding to the recovered primary service processing unit 230, and physical interface card 220 may stop interacting with standby service processing unit 242. The primary service processing unit 230 may transmit the communication information processed by primary service processing unit 230 to switching unit 250, and switching unit 250 then performs subsequent processes as transmission on the received communication information. Moreover, switching unit 250 transmits the service data that is to be transmitted to the standby service processing unit 242 and should be processed by the recovered primary service processing unit 230 to the primary service processing unit 230.

Specifically, in steps 402 and 403, control center 210 sends the first recovery command to physical interface card 220 corresponding to the recovered primary service processing unit 230 and sends the second recovery command to switching unit 250.

Upon receiving the first recovery command from control center 210, physical interface card 220 transmits the subsequently received communication information, which should be transmitted to the primary service processing unit 230 corresponding to the physical interface card 220, to primary service processing unit 230 rather than to standby service processing unit 242. Upon receiving the second recovery command, switching unit 250 determines that the service that should be processed by the primary service processing unit 230 has been switched from standby service processing unit 242 to primary service processing unit 230, and then transmits the subsequently received communication information, which should be transmitted to the primary service processing unit 230, to primary service processing unit 230 rather than to standby service processing unit 242.

In addition, upon determining that the primary service processing unit 230 has recovered, the control center 210 may send the third recovery command to routing unit 241. Upon receiving the third recovery command from control center 210, routing unit 241 determines to do nothing to the communication information with respect to the recovered primary service processing unit 230.

As shown above, both the system and method provided in the present invention can improve the reliability of service processing of the system and can increase the satisfaction degree of the user.

Though the present invention has been illustrated and described by some preferred embodiments, those skilled in the art should understand that various changes may be made in form and detail without departing from the spirit and the scope of the present invention and therefore should be covered in the protection scope of the present invention defined by the appended claims and its equivalents.

What is claimed is:

1. A system for implementing service switching, comprising:
   a primary service processing unit, a physical interface card connected to the primary service processing unit, a control center connected to the physical interface card, a switching unit connected to the primary service processing unit and the control center, and a standby service processing unit connected to the physical interface card and the switching unit, wherein
   the control center is used for acquiring and determining a working state of the primary service processing unit; when determining that the primary service processing unit is normal according to the working state, managing the physical interface card connected to the primary service processing unit to transmit service data to the primary service processing unit, and when determining that the primary service processing unit fails according to the working state, sending an identifier of a standby service processing unit to the physical interface card and the switching unit, and managing the physical interface card connected to the primary service processing unit to transmit the service data to the standby service processing unit according to the identifier, and managing the switching unit to transmit the service data to be transmitted to the primary service processing unit to the standby service processing unit according to the identifier;
   the switching unit is used for transmitting the service data to the primary service processing unit or to the standby service processing unit;
   the physical interface card is used for transmitting the service data to the primary service processing unit or to the standby service processing unit;
   the primary service processing unit is used for providing the working state of the primary service processing unit when the primary service processing unit is normal; and
   the standby service processing unit is used for processing the service data when the primary service processing unit fails.

2. The system of claim 1, wherein when the primary service processing unit recovers,
   the control center is further used for, according to the working state, managing the physical interface card connected to the primary service processing unit to transmit the service data to the primary service processing unit, and managing the switching unit to transmit the service data to the primary service processing unit;
   the switching unit is further used for transmitting the service data to the primary service processing unit;
   the physical interface card is further used for transmitting the service data to the primary service processing unit; and
   the primary service processing unit is further used for processing the service data.

3. The system of claim 1, further comprising:
   a routing unit connected between the standby service processing unit and the physical interface card; wherein
   when the primary service processing unit is normal, the physical interface card is further used for transmitting the service data to the routing unit; and
   when the primary service processing unit fails,
   the control center is further used for sending the identifier of the standby service processing unit to the routing unit, managing the routing unit to transmit the service data from the physical interface card connected to the primary service processing unit to the standby service processing unit according to the identifier; and
   the routing unit is used for transmitting the service data from the physical interface card to the standby service processing unit according to the identifier.

4. The system of claim 1, wherein the primary service processing unit and the physical interface card are configured on a same wiring board.

5. The system of claim 1, wherein the primary service processing unit and the physical interface card are configured on different wiring boards.

6. The system of claim 1, wherein,
   the control center comprises a Central Processing Unit (CPU); and
   the physical interface card comprises a physical interface circuit.

7. A method for implementing service switching, comprising:
   acquiring and determining a working state of a primary service processing unit;
   when the primary service processing unit fails,
   according to the working state of the primary service processing unit, sending an identifier of a standby service processing unit to a physical interface card and a switching unit, and managing the physical interface card connected to the primary service processing unit to transmit service data to a standby service processing unit according to the identifier, and managing the switching unit to transmit the service data to be transmitted to the primary service processing unit to the standby service processing unit according to the identifier; and
   processing the service data by the standby service processing unit.

8. The method of claim 7, further comprising:
when the primary service processing unit recovers, according to the working state of the primary service processing unit, managing the physical interface card connected to the primary service processing unit to transmit the service data to the primary service processing unit, and managing the switching unit to transmit the service data to the primary service processing unit; and
processing the service data by the primary service processing unit.

9. The method of claim 8, wherein managing the physical interface card connected to the primary service processing unit to transmit the service data to the primary service processing unit comprises:
sending a first recovery command to the physical interface card, and transmitting subsequent service data to the primary service processing unit according to the first recovery command.

10. The method of claim 8, wherein managing the switching unit to transmit the service data to the primary service processing unit comprises:
sending to the switching unit a recovery command including an identifier of the primary service processing unit and the identifier of the standby service processing unit, and according to the recovery command, transmitting subsequent service data to the primary service processing unit.

11. The method of claim 8, further comprising:
upon processing the service data by the standby service processing unit, transmitting the service data processed by the standby service processing unit to the switching unit.

12. The method of claim 8, further comprising:
configuring a routing unit between the physical interface card and the standby service processing unit;
sending to the routing unit a recovery command including an identifier of the primary service processing unit; and
upon receiving the recovery command, determining to stop processing the service data from the physical interface card.

13. The method of claim 7, wherein managing the physical interface card connected to the primary service processing unit to transmit service data to the standby service processing unit comprises:
sending to the physical interface card a first switching command including the identifier of the standby service processing unit, and according to the identifier of the standby service processing unit in the first switching command, transmitting subsequent service data to the standby service processing unit corresponding to the identifier of the standby service processing unit.

14. The method of claim 13, further comprising:
configuring a routing unit between the physical interface card and the standby service processing unit;
sending to the routing unit a second switching command including an identifier of the primary service processing unit through the first physical interface card; and
according to the identifier of the primary service processing unit in the second switching command, transmitting the service data from the physical interface card to the standby service processing unit corresponding to the identifier of the standby service processing unit.

15. The method of claim 13, further comprising:
configuring a routing unit between the physical interface card and the standby service processing unit;
when the primary service processing unit is normal, transmitting the service to the primary service processing unit and the routing unit; wherein
when the primary service processing unit fails, managing the physical interface card connected to the primary service processing unit to transmit service data to the standby service processing unit comprises:
sending to the physical interface card an interaction pause command including an identifier of the primary service processing unit, and sending to the routing unit a second switching command including the identifier of the primary service processing unit;
stopping interacting with the primary service processing unit corresponding to the identifier of the primary service processing unit according to the identifier of the primary service processing unit in the interaction pause command; and
transmitting subsequent service data from the physical interface card to the standby service processing unit according to the identifier of the primary service processing unit in the second switching command.

16. The method of claim 7, wherein transmitting the service data to the standby service processing unit comprises:
sending to the switching unit a switching command including an identifier of the primary service processing unit and the identifier of the standby service processing unit and transmitting subsequent service data to the standby service processing unit according to the switching command.

17. The method of claim 7, further comprising:
upon processing the service data by the standby service processing unit, transmitting the service data processed by the standby service processing unit to the switching unit.

18. The method of claim 7, wherein acquiring the working state of the primary service processing unit comprises:
sending an inquiry command to the primary service processing unit, and upon receiving the working state inquiry command from the control center, sending the working state of the primary service processing unit to the control center.

19. The method of claim 7, wherein acquiring the working state of the primary service processing unit comprises:
reporting the working state of the primary service processing unit to the control center.

20. The method of claim 7, wherein the working state comprises a parameter or a parameter value, and determining the working state of the primary service processing unit comprises:
determining the working state of the primary service processing unit according to the parameter or the parameter value.

* * * * *